(12) United States Patent
Merciu

(10) Patent No.: US 9,823,376 B2
(45) Date of Patent: Nov. 21, 2017

(54) ACOUSTIC MEASUREMENT TOOL

(71) Applicant: STATOIL PETROLEUM AS, Stavanger (NO)

(72) Inventor: Ioan-Alexandru Merciu, Hommelvik (NO)

(73) Assignee: STATOIL PETROLEUM AS, Stavanger (NO)

( * ) Notice: Subject to any disclaimer, the term of this patent is extended or adjusted under 35 U.S.C. 154(b) by 0 days.

(21) Appl. No.: 14/776,528

(22) PCT Filed: Mar. 15, 2013

(86) PCT No.: PCT/EP2013/055446
§ 371 (c)(1),
(2) Date: Sep. 14, 2015

(87) PCT Pub. No.: WO2014/139593
PCT Pub. Date: Sep. 18, 2014

(65) Prior Publication Data
US 2016/0041287 A1 Feb. 11, 2016

(51) Int. Cl.
G01V 1/46 (2006.01)
E21B 47/09 (2012.01)
E21B 47/00 (2012.01)
E21B 47/14 (2006.01)

(52) U.S. Cl.
CPC ............ *G01V 1/46* (2013.01); *E21B 47/0005* (2013.01); *E21B 47/091* (2013.01); *E21B 47/14* (2013.01)

(58) Field of Classification Search
CPC .... E21B 47/091; E21B 47/14; E21B 47/0005; G01V 1/46
USPC .......................................................... 367/25
See application file for complete search history.

(56) References Cited

U.S. PATENT DOCUMENTS

| | | | | |
|---|---|---|---|---|
| 3,811,529 A | * | 5/1974 | Crawford ............ | E21B 47/0005 181/104 |
| 4,805,156 A | * | 2/1989 | Attali .................. | E21B 47/0005 181/105 |
| 5,780,784 A | | 7/1998 | Robbins | |
| 5,886,303 A | | 3/1999 | Rodney | |
| 6,786,077 B2 | * | 9/2004 | Baumoel .................. | G01N 9/24 73/32 A |
| 2010/0195436 A1 | | 8/2010 | Kamata et al. | |
| 2011/0073368 A1 | | 3/2011 | Han et al. | |

* cited by examiner

*Primary Examiner* — Daniel L Murphy
(74) *Attorney, Agent, or Firm* — Birch, Stewart, Kolasch & Birch, LLP

(57) ABSTRACT

An acoustic measurement tool comprises a transmitter for generating acoustic signals and at least one acoustic receiver spaced from the transmitter and configured to receive an acoustic signal, generated by the transmitter, and which has encountered a medium of interest. Moreover, at least one acoustic reference receiver is located adjacent the transmitter and is configured to receive an acoustic signal, generated by the transmitter, prior to the acoustic signal encountering the medium of interest.

17 Claims, 2 Drawing Sheets

ACOUSTIC MEASUREMENT TOOL

FIELD OF THE INVENTION

This invention relates to an acoustic measurement tool. In particular embodiments, the invention relates to an acoustic measurement tool configured for deployment in a borehole, for example, for formation or cement logging.

BACKGROUND TO THE INVENTION

Current downhole acoustic (or sonic) tools use acoustic transmitters configured to generate acoustic wave signals having certain characteristics (i.e. frequency, amplitude, direction, etc). The acoustic waves travel through the surrounding environment by means of a pressure variation of the media and are reflected towards receivers where a signal is recorded. The acoustic waves recorded by the receivers are then analysed in a process known as sonic log interpretation and acoustic images (e.g. 3D borehole images) may be generated to try to determine the nature and/or structure of the environment.

In order to accurately interpret the received acoustic waves it is necessary to extract the acoustic characteristics of the transmitters. Today it is assumed that the transmitted signal will be the same as a simulated electronic signal generated by the tool and imposed by the tool design. Some authors recognise that some source anomalies can be identified in sonic logs as amplitude variations but these cannot be quantified. Accordingly, the traditional method of extracting source signals from received signals is prone to large errors and amplitude and frequency variations cannot be quantified in a defined manner.

It is therefore an aim of the present invention to provide an acoustic measurement tool which addresses at least some of the afore-mentioned problems.

SUMMARY OF THE INVENTION

According to a first aspect of the present invention there is provided an acoustic measurement tool comprising a transmitter for generating acoustic signals; at least one acoustic receiver spaced from the transmitter and configured to receive an acoustic signal, generated by the transmitter, and which has encountered a medium of interest; and at least one reference receiver located adjacent the transmitter and configured to receive an acoustic signal, generated by the transmitter, prior to the acoustic signal encountering the medium of interest.

Embodiments of the present invention therefore provide an acoustic measurement tool that can directly measure an acoustic signal emitted from a transmitter so as to provide a more accurate set of reference characteristics (i.e. a source signature for the transmitted acoustic signal) to help interpret the signals received at the receivers after they have encountered the medium of interest. For example, extraction of the source signature from the received signals may help to create a more accurate 3D sonic image than is currently possible.

It will be understood that the signal recorded by the reference receiver will essentially be equivalent to the actual signal transmitted through the media by the transmitter (as opposed to a theoretical signal calculated for the transmitter). The recorded signal may represent a direct arrival from the transmitter or a first reflected signal from a boundary spatially in front of the medium of interest.

In some embodiments, the reference receiver may be in contact with the transmitter. Alternatively, the reference receiver may be close to but spaced from the transmitter. For example, the reference receiver may be within 2 mm, 5 mm or 10 mm of the transmitter. Thus, the term 'adjacent' may be taken to mean, for example, in abutment with the transmitter or located near to the transmitter. It will be understood that the actual separation between the reference receiver and the transmitter is not critical, since all that is required is that the reference receiver is positioned so as to receive an acoustic signal generated by the transmitter, prior to the signal encountering the medium of interest. In other words, the reference receiver is located so as to receive an acoustic signal that has not encountered the medium of interest while the acoustic receivers are located so as to receive an acoustic signal that has encountered the medium of interest.

The acoustic signal may be transmitted directly from the transmitter or by the transmitter exciting an adjacent element (e.g. by flexing a metal component such as a casing body). Thus, the signal recorded by the reference receiver may be the signal generated by the excited element (e.g. metal component or casing).

The acoustic measurement tool may be configured for a downhole application, for example, in an on-shore or off-shore borehole connected with oil and/or gas extraction or exploration. The downhole application may comprise data collection for 3D acoustic imaging. In particular embodiments the acoustic measurement tool may be configured for a cement logging operation and/or for formation logging. The tool may be configured for use in a cased hole or in an open hole (e.g. to provide information about the mechanical properties of a formation).

Existing logging technology is limited to interpreting signals through one (inner) layer of pipe casing. In order to log behind a second or further layer of casing the inner casing (or at least the effect of it) needs to be removed and this is not always possible.

Embodiments of the present invention may enable logging through multiple casings. For example, the greater accuracy provided for by embodiments of the invention may allow cement properties to be obtained through multiple iterative processes so as to provide fully characterised cement impedance. Embodiments of the present invention may also enable logging in old wells where the structure may be uncertain.

In addition, embodiments of the invention may help to define minimum criteria for plug and abandonment operations and to provide improved data for post-cement job qualification or disqualification—thereby reducing the cost associated with casing recovery, when it is not necessary.

Embodiments of the tool may also be used to investigate wellhead fatigue so that well safety can be increased, for example, through better recognition of outer casing fatigue.

The reference receiver may be provided on a mount comprising highly absorbent material (e.g. rubber) so as to eliminate, or at least reduce, any perturbations resulting from the acoustic signal being transmitted to the reference receiver via the mount.

The tool may comprise a body which houses the transmitter, the at least one acoustic receiver and the reference receiver. Accordingly, the mount may be connected directly to the tool body or may be provided on the transmitter.

In a particular embodiment, the mount may encapsulate the reference receiver, with an aperture provided to allow for detection of the desired acoustic signal (that has not encountered the medium of interest) from the transmitter.

The transmitter may also be provided on a mount comprising highly absorbent material (e.g. rubber). The transmitter mount may be configured to focus the acoustic signals in a desired direction.

The transmitter may be of any desired type or configuration. For example, the transmitter may comprise one or more of a monopole, a dipole, a hammer, a shaker, a vibroseis or a high energy (e.g. electromagnetic) source.

Multiple acoustic transmitters may be employed, each of which may have a frequency range from 0 to 200 KHz.

The acoustic signal may encounter the medium of interest by passing there-through. Alternatively, the acoustic signal may encounter the medium of interest by being reflected there-from.

Accordingly to a second aspect of the invention there is provided an acoustic measurement method comprising: providing an acoustic measurement tool accordance to the first aspect of the invention in a borehole; operating the transmitter to generate acoustic signals; receiving at the reference receiver an acoustic signal, generated by the transmitter, prior to the acoustic signal encountering the medium of interest; and receiving at the at least one acoustic receiver an acoustic signal, generated by the transmitter, that has encountered the medium of interest.

The method may further comprise analysing the acoustic signal received at the at least one acoustic receiver, with reference to the acoustic signal received at the reference receiver. The analysis may comprise extraction of the acoustic signal received at the reference receiver from the acoustic signal received at the at least one acoustic receiver.

The method may further comprise generating an acoustic image (e.g. a 3D acoustic borehole image).

BRIEF DESCRIPTION OF THE DRAWINGS

Specific embodiments of the present invention will now be described with reference to the accompanying drawings, in which.

DETAILED DESCRIPTION OF CERTAIN EMBODIMENTS

Figure 1:
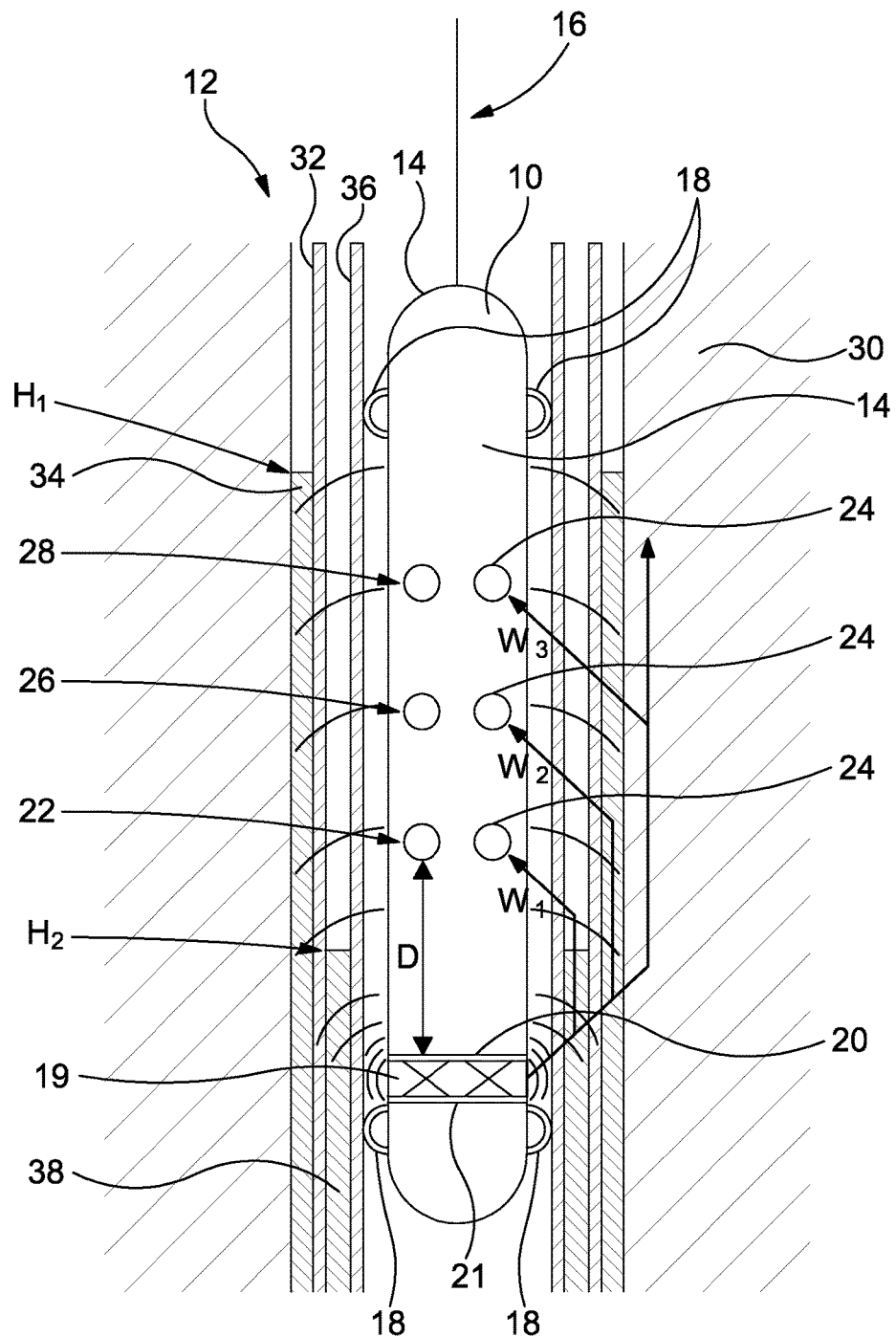
FIG. 1 shows a schematic cross-sectional view of a known acoustic measurement tool, deployed in a cased borehole.

With reference to FIG. 1, there is illustrated a known acoustic measurement tool 10, deployed in a cased borehole 12. The tool 10 comprises an elongate hollow body 14 deployed on a wireline 16. Centralisers 18 are provided around the proximal and distal ends of the body 14 to centre the tool 10 within the borehole 12.

A monopole transmitter 19 is provided in the distal end of the body 14 and is arranged to emit acoustic waves generally radially outwardly into the borehole. The transmitter 14 has upper 20 and lower 21 surfaces that are surrounded by rubber to prevent or minimise the travel of the acoustic waves within the body 14.

Disposed at a distance D above the transmitter 14 is a first row 22 of receivers 24. A second row 26 of receivers 24 is provided above and spaced from the first row 22 and a third row 28 of receivers 24 is provided above and spaced from the second row 26. It will be understood that although two receivers 24 are shown in each row, any number of receivers can be employed in each row, for example so as to enable signals to be received around the 360 degree circumference of the body 14.

In the example shown in FIG. 1, the borehole 12 is provided in a formation 30. An outer tubular metal casing 32 is provided and is cemented to the formation by a first layer of cement 34 up to a height $H_1$. An inner tubular metal casing 36 is then provided and is cemented to the outer casing 32 by a second layer of cement 38 up to a height $H_2$. Notably, the height $H_1$ of the first layer of cement 34 is higher than the height $H_2$ of the second layer of cement 38. The centralisers 18 are configured to centralise the tool 10 within the inner casing 36.

Examples of the wave paths along which the transmitted acoustic waves travel are illustrated in FIG. 1. A first wave path $W_1$ passes through the inner casing 36, along the second layer of cement 38 and past the height $H_2$ before being reflected back to the tool 10 to be received by the first row 22 of receivers 24. A second wave path $W_2$ passes through the inner casing 36, the second layer of cement 38 and the outer casing 32, along the first layer of cement 38, and is then reflected back to the tool 10 to be received by the second row 26 of receivers 24. A third wave path $W_3$ passes through the inner casing 36, the second layer of cement 38, the outer casing 32 and the first layer of cement 38, along the formation 30, and is then reflected back to the tool 10 to be received by the third row 28 of receivers 24.

In accordance with Equation (1) below, the acoustic wave form received at the receivers 24 can be determined from the convolution of the source signal and the reflected wave.

$$\text{Acoustic wave form} = \text{source signal} \otimes \text{reflected wave} \quad \text{Equation (1)}$$

As per current practice, the source signal will be assumed from electronic simulations and the reflected wave will be a function of: i) the media through which the waves have travelled; ii) the distance of the receiver 24 from the transmitter 19 (known from the tool design); and iii) the attenuation of the portion of the transmitted signal that travels directly to the receiver 24 via the body 14 (this can be determined from knowledge of the tool design and the source signal). The aim is therefore to extract the information about the medium from the signal received by the receivers 24 through de-convolution of Equation (1).

However, during migration of the wave field, amplitude variation of the source signal has been identified and as this cannot be measured with today's technology, it is not possible to accurately derive information about the media of interest.

Figure 2:
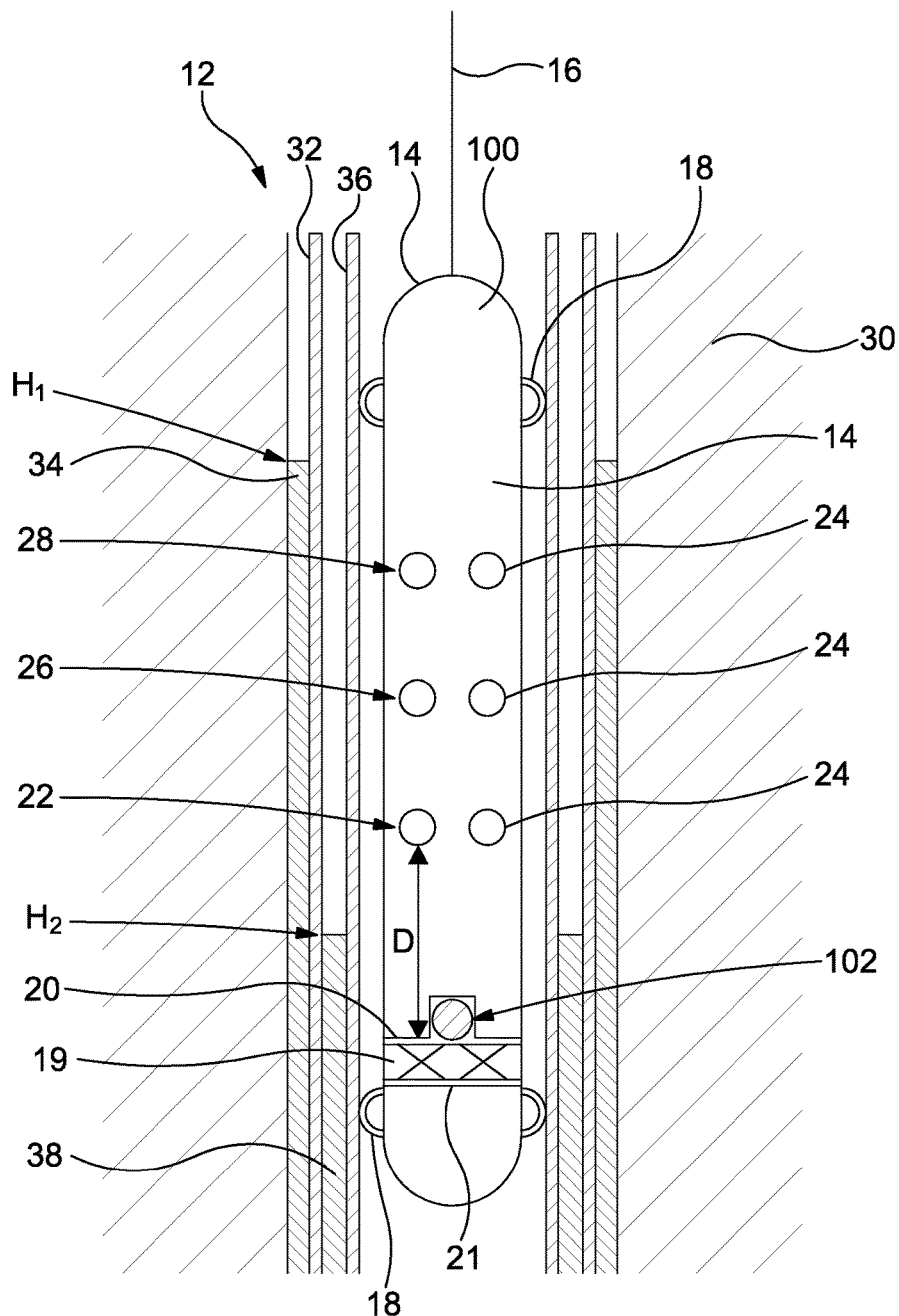
FIG. 2 shows a schematic cross-sectional view of an acoustic measurement tool according to an embodiment of the present invention, when deployed in a cased borehole.

FIG. 2 shows an acoustic measurement tool 100, according to an embodiment of the present invention, which aims to address this problem. The basic construction of the tool 100 is substantially similar to the tool 10 described above and so similar references are employed. However, in this case, a reference receiver 102 is provided adjacent to the transmitter 19 so as to measure (in real-time) the actual acoustic signal output generated by the transmitter 19. As explained above, this reference signal can be used as the source signal to more accurately de-convolute Equation (1) so as to extract information about the medium from the signal received by the receivers 24. A more accurate 3D sonic image may then be created.

It will also be understood that, in FIG. 2, the rubber on the upper surface 20 of the transmitter 19 is adapted to form a mount 104 which encapsulates the reference receiver 102 and the transmitter 19 so as to prevent or minimise the travel of the acoustic waves within the rest of the body 14.

It will be appreciated by persons skilled in the art that various modifications may be made to the above embodiment without departing from the scope of the present invention, as defined by the claims.

The invention claimed is:

1. An acoustic measurement tool comprising:
   a transmitter for generating acoustic signals;
   at least one acoustic receiver spaced from the transmitter and configured to receive an acoustic signal, generated by the transmitter, and which has encountered a medium of interest; and
   at least one reference receiver located adjacent the transmitter and configured to receive an acoustic signal, generated by the transmitter, prior to the acoustic signal encountering the medium of interest,
   wherein the reference receiver is provided on a mount comprising highly absorbent material so as to eliminate or at least reduce any perturbations resulting from the acoustic signal being transmitted to the reference receiver via the mount.

2. The tool according to claim 1, comprising a body which houses the transmitter, the at least one acoustic receiver and the reference receiver.

3. The tool according to claim 2, wherein the mount is connected directly to the tool body or is provided on the transmitter.

4. The tool according to claim 3, wherein the mount encapsulates the reference receiver, with an aperture provided to allow for detection of the acoustic signal, generated by the transmitter, prior to the acoustic signal encountering the medium of interest.

5. The tool according to claim 3, wherein the transmitter is provided on a mount comprising highly absorbent material.

6. The tool according to claim 2, wherein the mount encapsulates the reference receiver, with an aperture provided to allow for detection of the acoustic signal, generated by the transmitter, prior to the acoustic signal encountering the medium of interest.

7. The tool according to claim 2, wherein the transmitter is provided on a mount comprising highly absorbent material.

8. The tool according to claim 1, wherein the mount encapsulates the reference receiver, with an aperture provided to allow for detection of the acoustic signal, generated by the transmitter, prior to the acoustic signal encountering the medium of interest.

9. The tool according to claim 1, wherein the transmitter is provided on a mount comprising highly absorbent material.

10. The tool according to claim 1, wherein the transmitter is provided on a mount comprising highly absorbent material.

11. The tool according to claim 10, wherein the transmitter mount is configured to focus the acoustic signals in a desired direction.

12. The tool according to claim 1, wherein the acoustic signal encounters the medium of interest by passing therethrough.

13. The tool according to claim 1, wherein the acoustic signal encounters the medium of interest by being reflected there-from.

14. An acoustic measurement method comprising:
    providing an acoustic measurement tool in accordance with claim 1, in a borehole;
    operating the transmitter to generate acoustic signals;
    receiving at the reference receiver an acoustic signal, generated by the transmitter, prior to the acoustic signal encountering the medium of interest; and
    receiving at the at least one acoustic receiver an acoustic signal, generated by the transmitter, and which has encountered the medium of interest.

15. The method of claim 14, further comprising analyzing the acoustic signal received at the at least one acoustic receiver, with reference to the acoustic signal received at the reference receiver.

16. The method of claim 15, wherein the analysis comprises extraction of the acoustic signal received at the reference receiver from the acoustic signal received at the at least one acoustic receiver.

17. The method of claim 14, further comprising generating an acoustic image.

* * * * *